(12) United States Patent
Sheepwash et al.

(10) Patent No.: US 11,926,179 B2
(45) Date of Patent: *Mar. 12, 2024

(54) SIDEWALL SUPPORTS FOR PNEUMATIC TIRES

(71) Applicant: Bridgestone Corporation, Chuo-ku (JP)

(72) Inventors: Erin Sheepwash, Cuyahoga Falls, OH (US); Ryan J. Hue, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 133 days.

This patent is subject to a terminal disclaimer.

(21) Appl. No.: 17/607,322

(22) PCT Filed: Apr. 29, 2020

(86) PCT No.: PCT/US2020/030550
§ 371 (c)(1),
(2) Date: Oct. 28, 2021

(87) PCT Pub. No.: WO2020/223404
PCT Pub. Date: Nov. 5, 2020

(65) Prior Publication Data
US 2022/0203782 A1    Jun. 30, 2022

Related U.S. Application Data

(60) Provisional application No. 62/840,834, filed on Apr. 30, 2019, provisional application No. 62/840,257, filed on Apr. 29, 2019.

(51) Int. Cl.
*B60C 17/00* (2006.01)
*B60C 5/14* (2006.01)
(Continued)

(52) U.S. Cl.
CPC ............ *B60C 17/0009* (2013.01); *B60C 5/14* (2013.01); *C08K 5/19* (2013.01);
(Continued)

(58) Field of Classification Search
CPC ........ B60C 2001/0033; B60C 17/0054; B60C 17/0053; B60C 17/0072
See application file for complete search history.

(56) References Cited

U.S. PATENT DOCUMENTS 6,322,721 B1    11/2001    Yankner et al.
7,448,422 B2    11/2008    Markoff et al.
(Continued)

FOREIGN PATENT DOCUMENTS

CN    101429299        5/2009
CN    102241842 A    11/2011
(Continued)

OTHER PUBLICATIONS

Machine translation of RU 2620058, 2017.*
(Continued)

*Primary Examiner* — Justin R Fischer
(74) *Attorney, Agent, or Firm* — Meredith E. Hooker; Arthur M. Reginelli

(57) ABSTRACT

A method of preparing a sidewall support, the method comprising the steps of (i) providing a vulcanizable composition including an elastomer, a filler, a curative, and a eutectic composition; (ii) fabricating the vulcanizable composition into a green sidewall support; and (iii) subjecting the green sidewall support to curing conditions.

21 Claims, 1 Drawing Sheet

(51) Int. Cl.
*C08K 5/19* (2006.01)
*B29D 30/72* (2006.01)
*B60C 1/00* (2006.01)

(52) U.S. Cl.
CPC .............. *B29D 2030/724* (2013.01); *B60C 2001/0033* (2013.01); *B60C 2017/0063* (2013.01); *B60C 2017/0072* (2013.01)

(56) References Cited

U.S. PATENT DOCUMENTS

| | | | |
|---|---|---|---|
| 9,006,335 B2 | 4/2015 | Iizuka et al. | |
| 2010/0071825 A1 | 3/2010 | Roesgen et al. | |
| 2016/0053097 A1 | 2/2016 | Koda et al. | |
| 2016/0236939 A1 | 8/2016 | DeMiguel et al. | |
| 2017/0342240 A1 | 11/2017 | Selvan et al. | |
| 2019/0184767 A1* | 6/2019 | Zemla | B60C 17/0018 |
| 2020/0308372 A1 | 10/2020 | Hojdis et al. | |

FOREIGN PATENT DOCUMENTS

| | | | |
|---|---|---|---|
| CN | 103752214 | | 4/2014 |
| CN | 105916807 A | | 8/2016 |
| DE | 2835494 | | 2/1980 |
| DE | 102007034590 | | 2/2008 |
| EP | 867472 | * | 9/1998 |
| EP | 2123489 A1 | | 11/2009 |
| JP | 03137117 | | 6/1991 |
| JP | 9-111061 | * | 4/1997 |
| JP | 2000080105 A | | 3/2000 |
| JP | 2010-509415 | * | 3/2010 |
| JP | 2016028865 A | | 3/2016 |
| KR | 10-0962630 | | 6/2010 |
| RU | 2596251 | | 9/2016 |
| RU | 2620058 | * | 5/2017 |
| WO | 2018111773 A1 | | 6/2018 |
| WO | 2019072431 A1 | | 4/2019 |
| WO | 2019089788 | | 5/2019 |

OTHER PUBLICATIONS

International Search Report and Written Opinion dated Aug. 18, 2020, for PCT/US2020/030550, pp. 1-13.
Smith, E. L. et al., "Deep eutectic solvents (DESs) and their application", Chemical Reviews, 2014, vol. 114, pp. 11060-11082, table 1; figure 1.
Maka, H. et al., "Deep eutectic ionic liquids as epoxy resin curing agents", International Journal of Polymer Analysis and Characterization, 2014, vol. 19, pp. 682-692, abstract; p. 683; table 1.
Dumitru, C.-S. et al., Electrodeposition of Zinc Oxide Films from Choline Chloride Based Ionic Liquid Media Containing Zinc and Nitrate Ions. U.P.B. Sci. Bull., Series B, 2016, vol. 78, No. 3, pp. 59-74.
Maciejewska et al.; Thermal analysis and mechanical methods applied to studying properties of SBR compounds containing ionic liquids; May 31, 2017; Polymer Testing 61; 349-363.
MAO; Exploration of the Feasibility of Reduction of Zinc Oxide; World Rubber Industry, vol. 39, No. 1; 2012.
Longfei et al.; Progress in Rubber Vulcanization Accelerator, Progress in Chemistry, vol. 27, No. 10, pp. 1500-1508; Oct. 15, 2015.
English Translation of Chinese Office Action dated Dec. 8, 2022 from corresponding application CN 202080035318.7.
Supplementary European Search Report dated Dec. 7, 2022 from corresponding application EP 20799458.3.

* cited by examiner

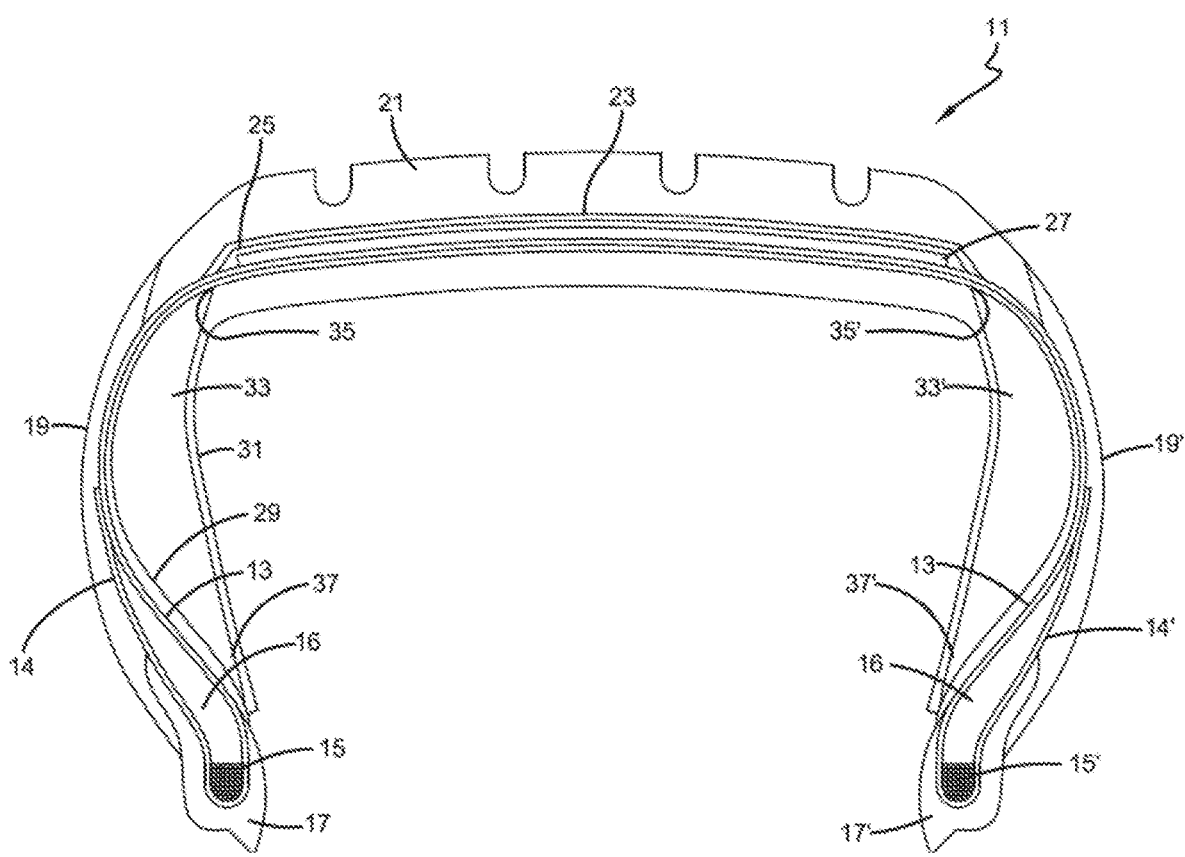

SIDEWALL SUPPORTS FOR PNEUMATIC TIRES

This application is a National-Stage application of PCT/US2020/030550 filed on Apr. 29, 2020, which claims the benefit of U.S. Provisional Application Ser. No. 62/840,257 filed on Apr. 29, 2019, and U.S. Provisional Application Ser. No. 62/840,834 filed on Apr. 30, 2019, all of which are incorporated herein by reference.

FIELD OF THE INVENTION

Embodiments of the present invention generally relate to sidewall supports for pneumatic tires.

BACKGROUND OF THE INVENTION

In the art of making pneumatic tires, it is known to include a reinforcing member in the sidewall area of the tire. These reinforcing members enable a pneumatic tire to run for a relatively long distance in an uninflated condition. For example, U.S. Publ. No. 2010/0126648 discloses a pair of annular side reinforcing rubber layers having a crescent cross-section, each located between a carcass layer and an innerliner layer.

SUMMARY OF THE INVENTION

One or more embodiments of the present invention provide a method of preparing a sidewall support, the method comprising the steps of (i) providing a vulcanizable composition including an elastomer, a filler, a curative, and a eutectic composition; (ii) fabricating the vulcanizable composition into a green sidewall support; and (iii) subjecting the green sidewall support to curing conditions.

Other embodiments of the present invention provide a method of forming a pneumatic tire, the method including placing the sidewall support formed by a method of the present invention into a green tire.

Still other embodiments of the present invention provide a method of forming a pneumatic tire, the method including placing the sidewall support formed by a method of the present invention into a cured tire.

Yet other embodiments of the present invention provide a pneumatic tire comprising (i) a tread; (ii) a carcass; (iii) an optional innerliner layer; (iv) a pair of sidewall supports disposed on the carcass or on the optional innerliner layer, if present, where said sidewall supports are prepared from a vulcanizable composition including an elastomer, a filler, a curative, and a eutectic composition.

BRIEF DESCRIPTION OF THE DRAWING

The FIGURE is a cross-sectional view of a tire according to one or more embodiments of the invention.

DETAILED DESCRIPTION OF ILLUSTRATIVE EMBODIMENTS

Embodiments of the present invention are based, at least in part, on the discovery of sidewall supports for pneumatic tires that demonstrate improved properties, including increased resistance to degradation while being operated at elevated temperatures for extended periods of time. According to embodiments of the present invention, the supports are prepared from vulcanizable compositions that include a eutectic composition. It has unexpectedly been discovered that by including the eutectic composition within the sidewall support compositions, one or more advantageous properties can be achieved such as resistance to heat degradation.

Tire Structure

Aspects of the invention can be described with reference to the FIGURE, which shows tire 11, including carcass 13 extending between a pair of axially-spaced beads 15, 15'. Carcass 13 includes opposed turn-up portions 14, 14', which thereby cause body ply 13 to surround bead filler portions 16, 16', respectively. Abrasion strips 17, 17' partially encase body ply 13 at or near beads 15, 15'. Tire 11 further includes opposing sidewalls 19, 19', and tread portion 21, which forms the outermost circumferential surface of tire 11. Subtread 23 is disposed below tread 21, undertread 25 is disposed below subtread 23, and belt package 27 is disposed below undertread 25. Belt package 27, which may include a plurality of belts (not shown), is positioned above carcass 13, which itself may include one or more body plies (not shown). As shown only in the FIGURE, an innerliner 29 is disposed on the interior of carcass 13 relative to tread 21. As the skilled person will appreciate, tire 11 may also include various other components, which are not shown, such as, but not limited to, tread shoulders, cap plies, belt wedges, and belt shoulders.

According to embodiments of the present invention, tire 11 includes a pair of sidewall supports 33, 33', which may also be referred to as reinforcing members 33, 33', reinforcing layers 33, 33', annular reinforcements 33, 33', side-reinforcing layers 33, 33', or sidewall inserts 33, 33'. Tire 11 may be referred to as a self-supporting tire.

As shown in the FIGURE, sidewall supports 33, 33' may be disposed below innerliner 29 (i.e. interior to innerliner 29) relative to sidewalls 19, 19'. Each of the sidewall supports 33, 33' has one longitudinal edge 35, 35' disposed on the inner surface of innerliner 29 at a position near tread 21, and an opposing longitudinal edge 37, 37' near the corresponding bead 15, 15'. In other embodiments, sidewall supports 33, 33' may be disposed between innerliner 29 and sidewalls 19, 19'.

In one or more embodiments, sidewall supports 33, 33' generally correspond to sidewalls 19, 19'. That is, sidewall supports 33, 33' have a length that generally extends with the length of a corresponding sidewall 19, 19'. In one or more embodiments, sidewall supports 33, 33' are generally coextensive with at least 90%, in other embodiments at least 70%, and in other embodiments at least 50% of the length of a corresponding sidewall 19, 19'. In one or more embodiments, sidewall supports 33, 33' extend the entire length of a corresponding sidewall 19, 19'.

In or more embodiments, the sidewall supports are shaped to be positioned within the interior of a tire proximate to the sidewall. Stated another way, the sidewall supports may be adapted to be received within the interior of the tire adjacent the carcass opposite the sidewall. In one or more embodiments, the sidewall supports are crescent shaped. In these or other embodiments, the longitudinal ends of the sidewall supports are tapered, with each tapered end extending toward the middle to a maximum thickness portion of sidewall supports. In one or more embodiments, the sidewall supports are utilized to achieve a substantially constant sidewall thickness, which configuration is further disclosed in U.S. Pat. No. 7,448,422, which is incorporated herein by reference.

Practice of one or more embodiments of the present invention is not necessarily limited by the particular configuration of the sidewall supports employed. The overall configuration of the support members, and their arrangement within a tire, are generally known as disclosed in U.S. Pat. Nos. 3,911,987, 3,949,798, 3,954,131, 4,067,372, 4,202,393, 4,203,481, 4,261,405, 4,265,288, 4,287,924, 4,365,659; 4,779,658, 4,917,164, 4,929,684, 5,217,549, 5,309,970, 5,427,166, 5,511,599, 5,769,980, 6,453,961, 6,488,797, 6,834,696, 6,988,522, 7,409,974, and 8,590,586; and U.S. Publication No. 2010/0126648; all of which are incorporated herein by reference.

In one or more embodiments, the tires of the present invention may include a layer of an adhesive layer between sidewall supports 33, 33' and at least one of the innermost layers of the tire. In particular embodiments, the adhesive layer may be disposed on the interior carcass layer 13, or in other embodiments it may be disposed on the interior innerliner layer 29. In one or more embodiments, the adhesive layer may be disposed only to correspond with the length of sidewall supports 33, 33'. As the skilled person appreciates, the adhesive serves to secure supporting members 33, 33' in place.

The adhesive layer may include a variety of adhesives including those known in the art for bonding to cured rubber surfaces. In one more embodiments, the adhesive layer may derive from a pressure sensitive adhesive (e.g. a tape), or in other embodiments, the adhesive layer may derive from an adhesive cement (e.g. reactive adhesives and/or solvent borne adhesives).

In one or more embodiments, the adhesive layer may have advantageous adhesion to sidewall supports 33, 33'. In one or more embodiments, the adhesive layer may have an adhesion to the sidewall supports (e.g. sidewall supports 33, 33') of more than 5 N/mm, in other embodiments more than 10 N/mm, in other embodiments more than 15 N/mm, in other embodiments more than 30 N/mm, and in other embodiments more than 50 N/mm. In one or more embodiments, the adhesive layer may have an adhesion to the carcass of from about 1 N/mm to about 50 N/mm, in other embodiments from about 5 N/mm to about 30 N/mm, and in other embodiments from about 5 N/mm to about 15 N/mm. The adhesion may be measured by ASTM D903 or ASTM D1876.

In one or more embodiments, the tires of the present invention may include a layer of an anti-tack composition disposed to at least one of the innermost layers of the tire. In particular embodiments, the anti-tack composition, which may be referred to as an anti-tack coating, may be disposed on the interior carcass layer 13, or in other embodiments it may be disposed on the interior innerliner layer 29. In particular embodiments, the anti-tack composition may include a composition including a polymeric resin selected from acrylic resins and/or vinyl acetate copolymers as disclosed in U.S. Publication No. 2003/0230369, which is incorporated herein by reference.

In one or more embodiments, the sidewall supports are rubber composites including a cured (i.e. vulcanized) rubber reinforced with a reinforcing material such as fabric or steel cord. In one or more embodiments, the rubber may likewise be reinforced with reinforcing fibers or flock and/or reinforcing fillers. The reinforcing fibers may include either natural or man-made fibers and include, but are not limited to, fibers fabricated from cotton, aramid, nylon, polyester, PET, PEN, carbon fiber, steel, fiberglass, or any combination thereof. The reinforcing fillers may include organic and inorganic reinforcing fillers and include, but are not limited to, carbon black and silica.

Vulcanizable Composition for Forming Sidewall Supports

As indicated above, the sidewall supports include a vulcanized rubber composition deriving from a vulcanizable composition that includes an elastomeric polymer (e.g. natural rubber and diene (co)polymers)), a curative, filler, and a eutectic composition, as well as other optional ingredients including, but not limited to, antidegradants, cure activators, cure accelerators, oils, resins, plasticizers, pigments, fatty acids, zinc oxide, and peptizing agents. In particular embodiments, the vulcanizable composition optionally includes a low molecular weight, high vinyl polymer additive.

Rubber

As suggested above, the sidewall supports can be prepared using a vulcanizable composition that includes an elastomeric polymer, which may also be referred to as a rubber polymer, vulcanizable polymer, or simply an elastomer. In one or more embodiments, the elastomeric polymer may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms. In particular embodiments, a vulcanizable composition includes a blend of natural rubber and synthetic diene rubber such as polybutadiene. In other embodiments, a vulcanizable composition includes olefinic rubber such ethylene-propylene-diene rubber (EPDM).

The elastomers may be characterized by their number average molecular weight (Mn), which may be measured by using gel permeation chromatography using polystyrene standards and adjusted with Mark-Houwink parameters. According to embodiments of the present invention, the elastomers may have a Mn of greater than 120, in other embodiments greater than 150, and in other embodiments greater than 180 kg/mol. In these or other embodiments, the elastomers may have a Mn of less than 800, in other embodiments less than 600, and in other embodiments less than 400 kg/mol. In one or more embodiments, the elastomers have a Mn of from about 120 to about 800, in other embodiments from about 150 to about 600, and in other embodiments from about 180 to about 400 kg/mol.

Filler

As suggested above, the sidewall supports can be prepared using a vulcanizable composition that includes a filler. The filler may include one or more conventional reinforcing or non-reinforcing fillers. For example, useful fillers include carbon black, silica, alumina, and silicates such as calcium, aluminum, and magnesium silicates.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In one or more embodiments, the carbon blacks may have a surface area of at least 20 $m^2/g$, in other embodiments at least 35 $m^2/g$, in other embodiments at least 50 $m^2/g$, and in other embodiments at least 60 $m^2/g$. In these or other embodiments, the carbon blacks have a surface area of from about 20 to about 110 $m^2/g$, in other embodiments from about 25 to about 80 $m^2/g$, in other embodiments from about 30 to about 60 $m^2/g$, in other embodiments from about 60 to about 110 $m^2/g$, and in other embodiments from about 40 to about 50 $m^2/g$. For purposes of this specification, and unless otherwise specified, carbon black surface area values are determined by ASTM D-1765 using the cetyltrimethylammonium bromide (CTAS) technique. The carbon blacks may be in a pelletized form or an unpelletized flocculent form. The preferred form of carbon black may depend upon the type of mixing equipment used to mix the rubber compound.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil(™) 215, Hi-Sil(™) 233, and Hi-Sil(™) 190 (PPG Industries, Inc.; Pittsburgh, PA). Other suppliers of commercially available silica include Grace Davison (Baltimore, MD), Degussa Corp. (Parsippany, NJ), Rhodia Silica Systems (Cranbury, NJ), and J. M. Huber Corp. (Edison, NJ).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Curative

As suggested above, the various tire components can be prepared using a vulcanizable composition that includes a curative. A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Eutectic Composition

In one or more embodiments, a eutectic composition includes those compositions formed by combining two or more compounds that provide a resultant combination having a melting point lower than the respective compounds that are combined. For purposes of this specification, eutectic composition may be referred to as a eutectic mixture, eutectic complex, or eutectic pair. Each of the compounds that are combined may be referred to, respectively, as a eutectic ingredient, eutectic constituent, eutectic member, or compound for forming a eutectic composition (e.g. first and second compound). Depending on the relative amounts of the respective eutectic ingredients, as well as the temperature at which the observation is made, the eutectic composition may be in the form of a liquid, which may be referred to as a eutectic liquid or eutectic solvent. For a given composition, where relative amounts of the respective ingredients are at or proximate to the lowest melting point of the eutectic mixture, then the composition may be referred to as a deep eutectic solvent, which may be referred to as DES.

Without wishing to be bound by any particular theory, it is believed that the eutectic ingredients combine or otherwise react or interact to form a complex. Thus, any reference to eutectic mixture, or eutectic combination, eutectic pair, or eutectic complex will include combinations and reaction products or complexes between the constituents that are combined and yield a composition having a lower melting point than the respective constituents. For example, in one or more embodiments, useful eutectic compositions can be defined by the formula I:

$$Cat^+X^-zY$$

where $Cat^+$ is a cation, $X^-$ is a counter anion (e.g. Lewis Base), and z refers to the number of Y molecules that interact with the counter anion (e.g. Lewis Base. For example, $Cat^+$ can include an ammonium, phosphonium, or sulfonium cation. $X^-$ may include, for example, a halide ion. In one or more embodiments, z is a number that achieves a deep eutectic solvent, or in other embodiments a number that otherwise achieves a complex having a melting point lower than the respective eutectic constituents.

In one or more embodiments, a useful eutectic composition includes a combination of an acid and a base, where the acid and base may include Lewis acids and bases or Bronsted acids and bases. In one or more embodiments, useful eutectic compositions include a combination of a quaternary ammonium salt with a metal halide (which are referred to as Type I eutectic composition), a combination of a quaternary ammonium salt and a metal halide hydrate (which are referred to as Type II eutectic composition), a combination of a quaternary ammonium salt and a hydrogen bond donor (which are referred to as Type III eutectic composition), or a combination of a metal halide hydrate and a hydrogen bond donor (which are referred to as Type IV eutectic composition). Analogous combinations of sulfonium or phosphonium in lieu of ammonium compounds can also be employed and can be readily envisaged by those having skill in the art.

Quaternary Ammonium Salt

In one or more embodiments, the quaternary ammonium salt is a solid at 20° C. In these or other embodiments, the metal halide and hydrogen bond donor are solid at 20° C.

In one or more embodiments, useful quaternary ammonium salts, which may also be referred to as ammonium compounds, may be defined by the formula II:

$$(R_1)(R_2)(R_3)(R_4)-N^+-\Phi^-$$

where each $R_1$, $R_2$, $R_3$, and $R_4$ is individually hydrogen or a monovalent organic group, or, in the alternative, two of $R_1$, $R_2$, $R_3$, and $R_4$ join to form a divalent organic group, and $\Phi^-$ is a counter anion. In one or more embodiments, at least one, in other embodiments at least two, and in other embodiments at least three of $R_1$, $R_2$, $R_3$, and $R_4$ are not hydrogen.

In one or more embodiments, the counter anion (e.g. $\Phi^-$) is selected from the group consisting of halide ($X^-$), nitrate ($NO_3^-$), tetrafluoroborate ($BF_4^-$), perchlorate ($ClO_4^-$), triflate ($SO_3CF_3^-$), trifluoroacetate ($COOCF_3^-$). In one or more embodiments, $\Phi^-$ is a halide ion, and in certain embodiments a chloride ion.

In one or more embodiments, the monovalent organic groups include hydrocarbyl groups, and the divalent organic groups include hydrocarbylene groups. In one or more embodiments, the monovalent and divalent organic groups include a heteroatom, such as, but not limited to, oxygen and nitrogen, and/or a halogen atom. Accordingly, the monovalent organic groups may include alkoxy groups, siloxy groups, ether groups, and ester groups, as well as carbonyl or acetyl substituents. In one or more embodiments, the hydrocarbyl groups and hydrocarbylene group include from 1 (or the appropriate minimum number) to about 18 carbon atoms, in other embodiments from 1 to about 12 carbon atoms, and in other embodiments from 1 to about 6 carbon atoms. The hydrocarbyl and hydrocarbylene groups may be branched, cyclic, or linear. Exemplary types of hydrocarbyl groups include alkyl, cycloalkyl, aryl and alkylaryl groups. Exemplary types of hydrocarbylene groups include alkylene, cycloalkylene, arylene, and alkylarylene groups. In particular embodiments, the hydrocarbyl groups are selected from the group consisting of methyl, ethyl, octadecyl, phenyl, and benzyl groups. In certain embodiments, the hydrocarbyl groups are methyl groups, and the hydrocarbylene groups are ethylene or propylene group.

Useful types of ammonium compounds include secondary ammonium compounds, tertiary ammonium compounds, and quaternary ammonium compounds. In these or other embodiments, the ammonium compounds include ammonium halides such as, but not limited to, ammonium chloride. In particular embodiments, the ammonium compound is a quaternary ammonium chloride. In certain embodiments, $R_1$, $R_2$, $R_3$, and $R_4$ are hydrogen, and the ammonium compound is ammonium chloride. In one or more embodiments, the ammonium compounds are asymmetric.

In one or more embodiments, the ammonium compound includes an alkoxy group and can be defined by the formula III:

$$(R_1)(R_2)(R_3)-N^+-(R_4-OH)\Phi^-$$

where each $R_1$, $R_2$, and $R_3$ is individually hydrogen or a monovalent organic group, or, in the alternative, two of $R_1$, $R_2$, and $R_3$ join to form a divalent organic group, $R_4$ is a divalent organic group, and $\Phi^-$ is a counter anion. In one or more embodiments, at least one, in other embodiments at least two, and in other embodiments at least three of $R_1$, $R_2$, and $R_3$, and are not hydrogen.

Examples of ammonium compounds defined by the formula III include, but are not limited to, N-ethyl-2-hydroxy-N,N-dimethylethanaminium chloride, 2-hydroxy-N,N,N-trimethylethanaminium chloride (which is also known as choline chloride), and N-benzyl-2-hydroxy-N,N-dimethlethanaminium chloride.

In one or more embodiments, the ammonium compound includes a halogen-containing substituent and can be defined by the formula IV:

$$\Phi^-(R_1)(R_2)(R_3)-N^+-R_4X$$

where each $R_1$, $R_2$, and $R_3$ is individually hydrogen or a monovalent organic group, or, in the alternative, two of $R_1$, $R_2$, and $R_3$ join to form a divalent organic group, $R_4$ is a divalent organic group, X is a halogen atom, and $\Phi^-$ is a counter anion. In one or more embodiments, at least one, in other embodiments at least two, and in other embodiments at least three of $R_1$, $R_2$, and $R_3$, are not hydrogen. In one or more embodiments, X is chlorine.

Examples of ammonium compounds defined by the formula III include, but are not limited to, 2-chloro-N,N,N-trimethylethanaminium (which is also referred to as chlorcholine chloride), and 2-(chlorocarbonyloxy)-N,N,N-trimethylethanaminium chloride.

Hydrogen-Bond Donor Compounds

In one or more embodiments, the hydrogen-bond donor compounds, which may also be referred to as HBD compounds, include, but are not limited to, amines, amides, carboxylic acids, and alcohols. In one or more embodiments, the hydrogen-bond donor compound includes a hydrocarbon chain constituent. The hydrocarbon chain constituent may include a carbon chain length including at least 2, in other embodiments at least 3, and in other embodiments at least 5 carbon atoms. In these or other embodiments, the hydrocarbon chain constituent has a carbon chain length of less than 30, in other embodiments less than 20, and in other embodiments less than 10 carbon atoms.

In one or more embodiments, useful amines include those compounds defined by the formula:

$R_1-(CH_2)_x-R_2$ wherein $R_1$ and $R_2$ are $-NH_2$, $-NHR_3$, or $-NR_3R_4$, and x is an integer of at least 2. In one or more embodiments, x is from 2 to about 10, in other embodiments from about 2 to about 8, and in other embodiments from about 2 to about 6.

Specific examples of useful amines include, but are not limited to, aliphatic amines, ethylenediamine, diethylenetriamine, aminoethylpiperazine, triethylenetetramine, tris(2-aminoethyl)amine, N,N'-bis-(2aminoethyle)piperazine, piperazinoethylethylenediamine, and tetraethylenepentaamine, propyleneamine, aniline, substituted aniline, and combinations thereof.

In one or more embodiments, useful amides include those compounds defined by the formula:

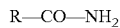

$R-CO-NH_2$ wherein R is H, $NH_2$, $CH_3$, or $CF_3$.

Specific examples of useful amides include, but are not limited to, urea, 1-methyl urea, 1,1-dimethyl urea, 1,3-dimethylurea, thiourea, urea, benzamide, acetamide, and combinations thereof.

In one or more embodiments, useful carboxylic acids include mono-functional, di-functional, and tri-functional organic acids. These organic acids may include alkyl acids, aryl acids, and mixed alkyl-aryl acids.

Specific examples of useful mono-functional carboxylic acids include, but are not limited to, aliphatic acids, phenylpropionic acid, phenylacetic acid, benzoic acid, and combinations thereof. Specific examples of di-functional carboxylic acids include, but are not limited to, oxalic acid, malonic acid, adipic acid, succinic acid, and combinations thereof. Specific examples of tri-functional carboxylic acids include citric acid, tricarballylic acid, and combinations thereof.

Types of alcohols include, but are not limited to, monools, diols, and triols. Specific examples of monools include aliphatic alcohols, phenol, substituted phenol, and mixtures thereof. Specific examples of diols include ethylene glycol, propylene glycol, resorcinol, substituted resorcinol, and mixtures thereof. Specific examples of triols include, but are not limited to, glycerol, benzene triol, and mixtures thereof.

Metal Halides

Types of metal halides include, but are not limited to, chlorides, bromides, iodides and fluorides. In one or more embodiments, these metal halides include, but are not limited to, transition metal halides. The skilled person can readily envisage the corresponding metal halide hydrates.

Specific examples of useful metal halides include, but are not limited to, aluminum chloride, aluminum bromide, aluminum iodide, zinc chloride, zinc bromide, zinc iodide, tin chloride, tin bromide, tin iodide, iron chloride, iron bromide, iron iodide, and combinations thereof. The skilled person can readily envisage the corresponding metal halide hydrates. For example, aluminum chloride hexahydrate and copper chloride dihydrate correspond to the halides mentioned above.

Formation of Eutectic Complex

The skilled person can select the appropriate eutectic members at the appropriate molar ratio to provide the desired eutectic composition. The skilled person appreciates that the molar ratio of the first compound (e.g. Lewis base) of the pair to the second compound (e.g. Lewis acid) of the pair will vary based upon the compounds selected. As the skilled person will also appreciate, the melting point suppression of a eutectic solvent includes the eutectic point, which is the molar ratio of the first compound to the second compound that yields the maximum melting point suppression (i.e. deep eutectic solvent). The molar ratio of the first compound to the second compound can, however, be varied to nonetheless produce a suppression in the melting point of a eutectic solvent relative to the individual melting points of the first and second compounds that is not the minimum melting point (i.e. not the point of maximum suppression). Practice of one or more embodiments of the present invention therefore includes the formation a eutectic solvent at molar ratios outside of the eutectic point.

In one or more embodiments, the compounds of the eutectic pair, as well as the molar ratio of the first compound to the second compound of the pair, are selected to yield a mixture having a melting point below 130° C., in other embodiments below 110° C., in other embodiments below 100° C., in other embodiments below 80° C., in other embodiments below 60° C., in other embodiments below 40° C., and in other embodiments below 30° C. In these or other embodiments, the compounds of the eutectic pair, as well as the molar ratio of the compounds, are selected to yield a mixture having a melting point above 0° C., in other embodiments above 10° C., in other embodiments above 20° C., in other embodiments above 30° C., and in other embodiments above 40° C.

In one or more embodiments, the compounds of the eutectic pair, as well as the molar ratio of the first compound to the second compound of the pair, are selected to yield a eutectic solvent having an ability or capacity to dissolve desired metal compounds, which may be referred to as solubility or solubility power. As the skilled person will appreciate, this solubility can be quantified based upon the weight of metal compound dissolved in a given weight of eutectic solvent over a specified time at a specified temperature and pressure when saturated solutions are prepared. In one or more embodiments, the eutectic solvents of the present invention are selected to achieve a solubility for zinc oxide, over 24 hours at 50° C. under atmospheric pressure, of greater than 100 ppm, in other embodiments greater than 500 ppm, in other embodiments greater than 1000 ppm, in other embodiments greater than 1200 ppm, in other embodiments greater than 1400 ppm, and in other embodiments greater than 1600 ppm, where ppm is measured on a weight solute to weight solvent basis.

In one or more embodiments, a eutectic solvent is formed by combining the first compound with the second compound at an appropriate molar ratio to provide a solvent composition (i.e. liquid composition at the desired temperature). The mixture may be mechanically agitated by using various techniques including, but not limited to, solid state mixing or blending techniques. Generally speaking, the mixture is mixed or otherwise agitated until a liquid that is visibly homogeneous is formed. Also, the mixture may be formed at elevated temperatures. For example, the eutectic solvent may be formed by heating the mixture to a temperature of greater than 50° C., in other embodiments greater than 70° C., and in other embodiments greater than 90° C. Mixing may continue during the heating of the mixture. Once a desired mixture is formed, the eutectic solvent can be cooled to room temperature. In one or more embodiments, the cooling of the eutectic solvent may take place at a controlled rate such as at a rate of less than 1° C./min.

In one or more embodiments, useful eutectic compositions can be obtained commercially. For example, deep eutectic solvents are commercially available under the tradenames Ionic Liquids from Scionix. Useful eutectic compositions are also generally known as described in U.S. Publ. Nos. 2004/0097755 A1 and 2011/0207633 A1, which are incorporated herein by reference.

Processing/Extender Oils

In one or more embodiments, the vulcanizable compositions of this invention include processing oils, which may also be referred to as extender oils. In one or more embodiments, the vulcanizable compositions are devoid or substantially devoid of processing oils.

In particular embodiments, the oils that are employed include those conventionally used as extender oils. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. As is generally understood in the art, oils refer to those compounds that have a viscosity that is relatively compared to other constituents of the vulcanizable composition, such as the resins.

Reinforcing Resins

In one or more embodiments, the vulcanizable compositions of this invention include a reinforcing resin, which may also be referred to as a thermosetting resin. Exemplary reinforcing resins include acrylic resins, alkyd resins, amine resins, amide resins, maleimide resins, maleic resins, epoxy resins, furan resins, phenolic resins, phenol formaldehyde resins, polyamide resins, polyester resins, urethane resins, vinyl resins, vinyl ester resins, cyanoacrylic resins, silicone resins, siloxane resins, melamine resins, urea-formaldehyde resins and fumaric resins. Examples of phenol resins suitable as reinforcing resins include novolac-type phenol resins, novolac-type cresol resins, novolac-type xylenol resins, novolac-type resorcinol resins, and an oil-modified resins therefrom.

Plasticizing Resins

In one or more embodiments, the vulcanizable compositions of the invention may include one or more plasticizing resins. These resins generally include hydrocarbon resins such as cycloaliphatic resins, aliphatic resins, aromatic resins, terpene resins, and combinations thereof.

In one or more embodiments, hydrocarbon resins may be characterized by a glass transition temperature (Tg) of from about 30 to about 160° C., in other embodiments from about 35 to about 60° C., and in other embodiments from about 70 to about 110° C. In one or more embodiments, hydrocarbon resins may also be characterized by its softening point being higher than its Tg. In certain embodiments, hydrocarbon resins have a softening point of from about 70 to about 160° C., in other embodiments from about 75 to about 120° C., and in other embodiments from about 120 to about 160° C.

Metal Activator and Organic Acid

In one or more embodiments, the vulcanizable compositions of the present invention include a metal compound. In one or more embodiments, the metal compound is an activator (i.e. assists in the vulcanization or cure of the rubber). In other embodiments, the metal activator is a metal oxide. In particular embodiments, the metal activator is a zinc species that is formed in situ through a reaction or interaction between zinc oxide and organic acid (e.g. stearic acid). In other embodiments, the metal compound is a magnesium compound such as magnesium hydroxide. In other embodiments, the metal compound is an iron compound such as an iron oxide. In other embodiments, the metal compound is a cobalt compound such as a cobalt carboxylate.

In one or more embodiments, the zinc oxide is an unfunctionalized zinc oxide characterized by a BET surface area of less than 10 $m^2/g$, in other embodiments less than 9 $m^2/g$, and in other embodiments less than 8 $m^2/g$. In other embodiments, nano zinc oxide is employed, which includes those zinc oxide particles that are characterized by a BET surface area of greater than 10 $m^2/g$.

In one or more embodiments, the organic acid is a carboxylic acid. In particular embodiments, the carboxylic acid is a fatty acid including saturated and unsaturated fatty acids. In particular embodiments, saturated fatty acids, such as stearic acid, are employed. Other useful acids include, but are not limited to, palmitic acid, arachidic acid, oleic acid, linoleic acid, and arachidonic acid.

Low Molecular Weight, High Vinyl Additive

In one or more embodiments, the vulcanizable compositions include a low molecular weight, high vinyl polydienes. The polydienes derive from the polymerization of conjugated diene monomer or the copolymerization of conjugated diene monomer with other monomer such as vinyl-substituted aromatic monomer. Exemplary low molecular weight, high vinyl polydienes include polyisoprene, polybutadiene, polyisobutylene-co-isoprene, poly(styrene-co-butadiene), poly(styrene-co-isoprene), poly(styrene-co-isoprene-co-butadiene), and poly(isoprene-co-butadiene), and mixtures thereof.

The low molecular weight, high vinyl polydienes may be characterized by their number average molecular weight (Mn), which may be measured by using gel permeation chromatography using polystyrene standards and adjusted with Mark-Houwink parameters. According to embodiments of the present invention, the low molecular weight, high vinyl polydienes may have a Mn of greater than 30, in other embodiments greater than 40, and in other embodiments greater than 50 kg/mol. In these or other embodiments, the low molecular weight, high vinyl polydienes may have a Mn of less than 120, in other embodiments less than 100, and in other embodiments less than 80 kg/mol. In one or more embodiments, the low molecular weight, high vinyl polydienes have a Mn of from about 30 to about 115, in other embodiments from about 40 to about 100, and in other embodiments from about 50 to about 80 kg/mol.

The low-molecular weight, high-vinyl polydienes may be characterized by their molecular weight distribution, which may also be referred to as polydispersity, and is represented by the ratio of the weight-average molecular weight (Mw) to the number-average molecular weight (Mn), which may be measured by using gel permeation chromatography using polystyrene standards and adjusted with Mark-Houwink parameters. According to embodiments of the present invention, the low-molecular weight, high-vinyl polydienes may have a polydispersity (Mw/Mn) of less than 2.0, in other embodiments less than 1.7, in other embodiments less than 1.4, in other embodiments less than 1.3, in other embodiments less than 1.2, and in other embodiments less than 1.1.

In one or more embodiments, the low molecular weight, high vinyl polydienes may be characterized by vinyl content, which may be described as the number of unsaturations in the 1,2 microstructure relative to the total unsaturations within the polymer chain. As the skilled person will appreciate, vinyl content can be determined by FTIR analysis. In one or more embodiments, the low molecular weight, high vinyl polydienes include greater than 40%, in other embodiments greater than 50%, and in other embodiments greater than 60% vinyl. In these or other embodiments, the low molecular weight, high vinyl polydienes include less than 95%, in other embodiments less than 90%, and in other embodiments less than 88%. In one or more embodiments, the low molecular weight, high vinyl polydienes include from about 40 to about 95%, in other embodiments from about 50 to about 90%, and in other embodiments from about 60 to about 88% vinyl.

Useful a low molecular weight, high vinyl polydienes are described in U.S. Publ. No. 2011/0190440, which is incorporated herein by reference.

Other Ingredients

Other ingredients that are typically employed in rubber compounding may also be added to the vulcanizable compositions employed for fabricating the sidewall supports of the invention. These include waxes, scorch inhibiting agents, processing aids, and peptizers.

Ingredient Amounts

Rubber

In one or more embodiments, the vulcanizable compositions include greater than 20, in other embodiments greater than 30, and in other embodiments greater than 40 percent by weight of the rubber component, based upon the entire weight of the composition. In these or other embodiments, the vulcanizable compositions include less than 90, in other embodiments less than 70, and in other embodiments less than 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Eutectic Composition

In one or more embodiments, the vulcanizable compositions include greater than 0.005, in other embodiments greater than 0.01, and in other embodiments greater than 0.02 parts by weight (pbw) of the eutectic composition per 100 parts by weight rubber (phr). In these or other embodiments, the vulcanizable compositions include less than 3, in other embodiments less than 1, and in other embodiments less than 0.1 pbw of the eutectic composition phr. In one or more embodiments, the vulcanizable compositions include from about 0.005 to about 3, in other embodiments from about 0.01 to about 1, and in other embodiments from about 0.02 to about 0.1 pbw of the eutectic composition phr.

In one or more embodiments, the amount of eutectic solvent can be described with reference to the loading of metal activator (such as zinc oxide). In one or more embodiments, the vulcanizable compositions include greater than 2, in other embodiments greater than 3, and in other embodiments greater than 5 wt % eutectic solvent based upon the total weight of the eutectic solvent and the metal activator (e.g. zinc oxide) present within the vulcanizable composition. In these or other embodiments, the vulcanizable compositions include less than 15, in other embodiments less than 12, and in other embodiments less than 10 wt % eutectic solvent based upon the total weight of the eutectic solvent and the metal activator (e.g. zinc oxide) present within the vulcanizable composition. In one or more embodiments, the vulcanizable compositions include from about 2 to about 15, in other embodiments from about 3 to about 12, and in other embodiments from about 5 to about 10 wt % eutectic solvent based upon the total weight of the eutectic solvent and the metal activator (e.g. zinc oxide) present within the vulcanizable composition.

Metal Compound

In one or more embodiments, the vulcanizable compositions include greater than 1.5, in other embodiments greater than 2.0, and in other embodiments greater than 2.5 parts by weight (pbw) of metal activator (e.g. zinc oxide) per 100 parts by weight rubber (phr). In these or other embodiments, the vulcanizable composition includes less than 8, in other embodiments less than 7, and in other embodiments less than 6 pbw of metal activator (e.g. zinc oxide) phr. In one or more embodiments, the vulcanizable composition includes from about 1.5 to about 8.0, in other embodiments from about 2.0 to about 7, and in other embodiments from about 2.5 to about 6 pbw of metal activator (e.g. zinc oxide) phr.

Organic Acid

In one or more embodiments, the vulcanizable compositions include greater than 0.5, in other embodiments greater than 0.7, and in other embodiments greater than 1.0 parts by weight (pbw) of organic acid (e.g. stearic acid) per 100 parts by weight rubber (phr). In these or other embodiments, the vulcanizable composition includes less than 5, in other embodiments less than 3, and in other embodiments less than 2 pbw of organic acid (e.g. stearic acid) phr. In one or more embodiments, the vulcanizable composition includes from about 0.5 to about 5, in other embodiments from about 0.7 to about 3, and in other embodiments from about 1.0 to about 2 pbw of organic acid (e.g. stearic acid) phr.

Filler

In one or more embodiments, the vulcanizable compositions include greater than 0, in other embodiments greater than 10, in other embodiments greater than 25, in other embodiments greater than 35, in other embodiments greater than 45, in other embodiments greater than 55, and in other embodiments greater than 65 parts by weight (pbw) of filler per 100 parts by weight rubber (phr). In these or other embodiments, the vulcanizable composition includes less than 200, in other embodiments less than 150, in other embodiments less than 120, in other embodiments less than 100, and in other embodiments less than 80 pbw of filler phr. In one or more embodiments, the vulcanizable composition includes from about 0 to about 200, in other embodiments from about 35 to about 120, and in other embodiments from about 45 to about 100 pbw of filler phr.

Carbon Black

In one or more embodiments, the vulcanizable compositions include greater than 0, in other embodiments greater than 10, in other embodiments greater than 25, in other embodiments greater than 45, in other embodiments greater than 55, in other embodiments greater than 60, in other embodiments greater than 65, and in other embodiments greater than 75 parts by weight (pbw) of a carbon black per 100 parts by weight rubber (phr). In these or other embodiments, the vulcanizable composition includes less than 200, in other embodiments less than 150, and in other embodiments less than 100 pbw of a carbon black phr. In one or more embodiments, the vulcanizable composition includes from about 10 to about 200, in other embodiments from about 40 to about 150, and in other embodiments from about 50 to about 100 pbw of a carbon black phr.

Silica

In one or more embodiments, the vulcanizable compositions include greater than 0.1, in other embodiments greater than 2.5, and in other embodiments greater than 5.0 parts by weight (pbw) silica per 100 parts by weight rubber (phr). In these or other embodiments, the vulcanizable composition includes less than 50, in other embodiments less than 30, in other embodiments less than 25, in other embodiments less than 20, in other embodiments less than 18, in other embodiments less than 15, in other embodiments less than 10, in other embodiments less than 5, in other embodiments less than 3, and in other embodiments less than 1 pbw of silica phr. In one or more embodiments, the vulcanizable composition includes from about 0.1 to about 50, in other embodiments from about 2.5 to about 30, and in other embodiments from about 3 to about 20 pbw of silica phr. In one or more embodiments, the vulcanizable compositions are devoid or substantially devoid of silica.

Filler Ratio

In one or more embodiments, the vulcanizable compositions can be characterized by the ratio of carbon black to other filler compounds such as silica. In one or more embodiments, carbon black is used in excess relative to the other fillers such as silica. In one or more embodiments, the ratio of the amount of carbon black to silica, based upon a weight ratio, is greater than 2:1, in other embodiments greater than 3:1, in other embodiments greater than 5:1, in other embodiments greater than 7:1, in other embodiments greater than 10:1, in other embodiments greater than 15:1, and in other embodiments greater than 20:1.

Silica Coupling Agent

In one or more embodiments, the vulcanizable compositions include greater than 1, in other embodiments greater than 2, and in other embodiments greater than 5 parts by weight (pbw) silica coupling agent per 100 parts by weight silica. In these or other embodiments, the vulcanizable composition includes less than 20, in other embodiments less than 15, and in other embodiments less than 10 pbw of the silica coupling agent per 100 parts by weight silica. In one or more embodiments, the vulcanizable composition includes from about 1 to about 20, in other embodiments from about 2 to about 15, and in other embodiments from about 5 to about 10 pbw of silica coupling agent per 100 parts by weight silica. In one or more embodiments, the vulcanizable compositions are devoid or substantially devoid of silica coupling agents.

Resin

In one or more embodiments, the vulcanizable compositions include greater than 1, in other embodiments greater than 15, and in other embodiments greater than 25 parts by weight (pbw) of resin (e.g. hydrocarbon resin) per 100 parts by weight rubber (phr). In these or other embodiments, the vulcanizable composition includes less than 150, in other embodiments less than 120, in other embodiments less than 90, in other embodiments less than 80, in other embodiments less than 60, and in other embodiments less than 45 pbw of resin (e.g. hydrocarbon resin) phr. In one or more embodiments, the vulcanizable composition includes from about 1 to about 150, in other embodiments from about 15 to about 100, and in other embodiments from about 25 to about 80 pbw of resin (e.g. hydrocarbon resin) phr. In one or more embodiments, the vulcanizable compositions are devoid or substantially devoid of resin.

Processing/Extender Oils

In one or more embodiments, the vulcanizable compositions include greater than 0.1, in other embodiments greater than 1, and in other embodiments greater than 2 parts by weight (pbw) of a processing oil (e.g. naphthenic oil) per 100 parts by weight rubber (phr). In these or other embodiments, the vulcanizable composition includes less than 20, in other embodiments less than 18, in other embodiments less than 15, in other embodiments less than 12, in other embodiments less than 10, and in other embodiments less than 8 pbw of a processing oil phr. In one or more embodiments, the vulcanizable composition includes from about 0.1 to about 20, in other embodiments from about 0.5 to about 18, in other embodiments from about 1 to about 15, and in other embodiments from about 2 to about 12 pbw of oil phr. In one or more embodiments, the vulcanizable compositions are devoid or substantially devoid of oils.

Plasticizing Additives

In one or more embodiments, the plasticizing resin and processing oils may be collectively referred to as plasticizing additives, ingredients, or constituents. In one or more embodiments, the vulcanizable compositions of this invention include greater than 0.1, in other embodiments greater than 1, and in other embodiments greater than 2 parts by weight (pbw) of plasticizing additives per 100 parts by weight rubber (phr). In these or other embodiments, the vulcanizable composition includes less than 15, in other embodiments less than 12, in other embodiments less than 10, in other embodiments less than 7, in other embodiments less than 5, and in other embodiments less than 3 pbw of plasticizing additives phr. In one or more embodiments, the vulcanizable composition includes from about 0.1 to about 15, in other embodiments from about 0.5 to about 10, in other embodiments from about 1 to about 7, and in other embodiments from about 2 to about 5 pbw of plasticizing additives phr.

Reinforcing Resins

In one or more embodiments, the vulcanizable compositions include greater than 0.1, in other embodiments greater than 1, and in other embodiments greater than 2 parts by weight (pbw) of a reinforcing resin (e.g. novolac resin) per 100 parts by weight rubber (phr). In these or other embodiments, the vulcanizable composition includes less than 8, in other embodiments less than 6, in other embodiments less than 5, and in other embodiments less than 4 pbw reinforcing resin phr. In one or more embodiments, the vulcanizable composition includes from about 0.1 to about 8, in other embodiments from about 0.5 to about 6, and in other embodiments from about 2 to about 4 pbw reinforcing resin phr. In one or more embodiments, the vulcanizable compositions are devoid or substantially reinforcing resins.

Low Molecular Weight, High Vinyl Additive

In one or more embodiments, the vulcanizable compositions include greater than 0.5, in other embodiments greater than 1.5, and in other embodiments greater than 1.7 parts by weight (pbw) of a low molecular weight, high vinyl polydienes per 100 parts by weight rubber (phr). In these or other embodiments, the vulcanizable composition includes less than 5.0, in other embodiments less than 4.0, in other embodiments less than 3.0 pbw of a low molecular weight, high vinyl polydienes phr. In one or more embodiments, the vulcanizable composition includes from about 0.5 to about 5.0, in other embodiments from about 1.5 to about 4.0, in other embodiments from about 1.7 to about 3.0 pbw of low molecular weight, high vinyl polydienes phr. In one or more embodiments, the vulcanizable compositions are devoid or substantially devoid of low molecular weight, high vinyl polydienes.

Method of Preparing Sidewall Supports

The sidewall supports of the present invention may be prepared by employing conventional rubber processing and curing techniques. For example, the ingredients may be solid-state mixed to form the vulcanizable composition of matter. This composition may then be fabricated into a desired shape to form a green sidewall support. The green sidewall support can then be cured.

In one or more embodiments, the vulcanizable compositions are prepared by mixing a vulcanizable rubber and the eutectic solvent to form a masterbatch, and then subsequently adding a curative to the masterbatch. The preparation of the masterbatch may take place using one or more sub-mixing steps where, for example, one or more ingredients may be added to the composition sequentially after an initial mixture is prepared by mixing two or more ingredients. Also, using conventional technology, additional ingredients can be added in the preparation of the vulcanizable compositions such as, but not limited to, carbon black, additional fillers, chemically-treated inorganic oxide, silica, silica coupling agent, silica dispersing agent, processing oils, processing aids such as zinc oxide and fatty acid, and antidegradants such as antioxidants or antiozonants.

In one or more embodiments, the eutectic composition is prepared prior to introducing the eutectic composition to the vulcanizable rubber. In other words, the first constituent of the mixture is pre-combined with the second constituent of the mixture prior to introducing the mixture to the vulcanizable composition. In one or more embodiments, the combined constituents of the mixture are mixed until a homogeneous liquid composition is observed.

In one or more embodiments, the eutectic composition is pre-combined with one or more ingredients of the rubber formulation prior to introducing the eutectic mixture to the vulcanizable composition. In other words, in one or more embodiments, a constituent of the vulcanizable composition (e.g. a metal compound such as zinc oxide) is combined with the eutectic mixture to form a pre-combination or masterbatch prior to introducing the pre-combination to the mixer in which the rubber is mixed. For example, zinc oxide may be dissolved in the eutectic solvent prior to introduction to the rubber within the mixer. In other embodiments, the eutectic composition is the minor component of the pre-combination, and therefore the constituent that is pre-mixed with the eutectic composition acts as a carrier for the eutectic composition. For example, the eutectic composition can be combined with a larger volume of zinc oxide, and the zinc oxide will act as a carrier for delivery the combination of zinc oxide and eutectic composition as a solid to the rubber within the mixer. In yet other embodiments, one of the members of the eutectic pair acts as a solid carrier for the eutectic composition, and therefore the combination of the first and second ingredients of the eutectic composition form a pre-combination that can be added as a solid to the rubber within the mixer. The skilled person will appreciate that mixtures of this nature can be formed by combining an excess of the first or second eutectic members is excess, relative to the other eutectic member, to maintain a solid composition at the desired temperature.

In one or more embodiments, the eutectic solvent is introduced to the vulcanizable rubber as an initial ingredient in the formation of a rubber masterbatch. As a result, the eutectic solvent undergoes high shear, high temperature mixing with the rubber. In one or more embodiments, the eutectic solvent undergoes mixing with the rubber at minimum temperatures in excess of 110° C., in other embodiments in excess of 130° C., and in other embodiments in excess of 150° C. In one or more embodiments, high shear, high temperature mixing takes place at a temperature from about 110° C. to about 170° C.

In other embodiments, the eutectic solvent is introduced to the vulcanizable rubber, either sequentially or simultaneously, with the sulfur-based curative. As a result, the eutectic solvent undergoes mixing with the vulcanizable rubber at a maximum temperature below 110° C., in other embodiments below 105° C., and in other embodiments below 100° C. In one or more embodiments, mixing with the curative takes place at a temperature from about 70° C. to about 110° C.

As with the eutectic solvent, the zinc oxide and the stearic acid can be added as initial ingredients to the rubber masterbatch, and therefore these ingredients will undergo high temperature, high shear mixing. Alternatively, the zinc oxide and the stearic acid can be added along with the sulfur-based curative and thereby only undergo low-temperature mixing.

In one or more embodiments, the zinc oxide is introduced to the vulcanizable rubber separately and individually from the eutectic solvent. In other embodiments, the zinc oxide and the eutectic solvent are pre-combined to form a zinc oxide masterbatch, which may include a solution in which the zinc oxide is dissolved or otherwise dispersed in the eutectic solvent. The zinc oxide masterbatch can then be introduced to the vulcanizable rubber.

In one or more embodiments, the polyisoprene rubber (e.g. natural rubber) is first masticated in order to achieve desired properties of viscosity and processability. After mixing the polyisoprene rubber, the other ingredients, such as the eutectic solvent, are introduced to the pre-processed polyisoprene rubber according to one or more embodiments of this invention.

Mixing Conditions

In one or more embodiments, a vulcanizable composition is prepared by first mixing a vulcanizable rubber and the eutectic solvent at a temperature of from about 140 to about 180, or in other embodiments from about 150 to about 170° C. In certain embodiments, following the initial mixing, the composition (i.e. masterbatch) is cooled to a temperature of less than 100° C., or in other embodiments less than 80° C., and a curative is added. In certain embodiments, mixing is continued at a temperature of from about 90 to about 110° C., or in other embodiments from about 95 to about 105° C., to prepare the final vulcanizable composition.

In one or more embodiments, the masterbatch mixing step, or one or more sub-steps of the masterbatch mixing step, may be characterized by the peak temperature obtained by the composition during the mixing. This peak temperature may also be referred to as a drop temperature. In one or more embodiments, the peak temperature of the composition during the masterbatch mixing step may be at least 140° C., in other embodiments at least 150° C., and in other embodiments at least 160° C. In these or other embodiments, the peak temperature of the composition during the masterbatch mixing step may be from about 140 to about 200° C., in other embodiments from about 150 to about 190° C., and in other embodiments from about 160 to about 180° C.

Final Mixing Step

Following the masterbatch mixing step, a curative or curative system is introduced to the composition and mixing is continued to ultimately form the vulcanizable composition of matter. This mixing step may be referred to as the final mixing step, the curative mixing step, or the productive mixing step. The resultant product from this mixing step may be referred to as the vulcanizable composition.

In one or more embodiments, the final mixing step may be characterized by the peak temperature obtained by the composition during final mixing. As the skilled person will recognize, this temperature may also be referred to as the final drop temperature. In one or more embodiments, the peak temperature of the composition during final mixing may be at most 130° C., in other embodiments at most 110° C., and in other embodiments at most 100° C. In these or other embodiments, the peak temperature of the composition during final mixing may be from about 80 to about 130° C., in other embodiments from about 90 to about 115° C., and in other embodiments from about 95 to about 105° C.

Mixing Equipment

All ingredients of the vulcanizable compositions can be mixed with standard mixing equipment such as internal mixers (e.g. Banbury or Brabender mixers), extruders, kneaders, and two-rolled mills. Mixing can take place singularly or in tandem. As suggested above, the ingredients can be mixed in a single stage, or in other embodiments in two or more stages. For example, in a first stage (i.e. mixing stage), which typically includes the rubber component and filler, a masterbatch is prepared. Once the masterbatch is prepared, the vulcanizing agents may be introduced and mixed into the masterbatch in a final mixing stage, which is typically conducted at relatively low temperatures so as to reduce the chances of premature vulcanization. Additional mixing stages, sometimes called remills, can be employed between the masterbatch mixing stage and the final mixing stage.

Once the vulcanizable composition is prepared, the vulcanizable composition can be fabricated into the desired sidewall support by employing conventional rubber shaping, molding, and curing techniques. Once formed into the desired shape, which forms an uncured sidewall support, which may also be referred to as a green sidewall support, the green sidewall support is cured, which may also be referred to as vulcanized. In one or more embodiments, vulcanization can be effected by heating the green support within a mold. In one or more embodiments, the green support can be heated to an internal temperature of from about 120° C. to about 180° C.

The cured or crosslinked rubber sidewall supports generally include three-dimensional polymeric networks that are thermoset (i.e., vulcanizates). The various ingredients, such as the eutectic solvent, processing aids and fillers, are generally dispersed throughout the vulcanized network.

Characteristics of Sidewall Supports

In one or more embodiments, the sidewall supports of the invention (e.g. sidewall supports 33) generally include an element that has sufficient strength to support one or more tire components (e.g. tread) at a sufficient distance from the wheel while the pneumatic tire is uninflated thereby enabling a pneumatic tire to run for a relatively long distance in an uninflated condition. Said another way, the sidewall supports substantially support the tire in a run-flat condition. Advantageously, the sidewall supports of one or more embodiments of the present invention maintain one or more certain characteristics after heat ageing (i.e. after experiencing time and elevated temperatures).

In one or more embodiments, the sidewall supports may be characterized by a Shore A hardness at 100° C. of more than 45, in other embodiments more than 50, in other embodiments more than 55, in other embodiments more than 60. In one or more embodiments, the sidewall supports may be characterized by a Shore A hardness at 100° C. of less than 100, in other embodiments less than 90, in other embodiments less than 80, in other embodiments less than 70.

In one or more embodiments, the sidewall supports may be characterized by a tan delta (100° C. at 10 Hertz) of less than 0.22, in other embodiments less than 0.20, in other embodiments less than 0.11, in other embodiments less than 0.07, in other embodiments less than 0.05, and in other embodiments less than 0.03. In these or other embodiments, the sidewall supports may be characterized by a tan delta (100° C. at 10 Hertz) of from about 0.01 to about 0.1, or in other embodiments from about 0.02 to about 0.05.

In one or more embodiments, the sidewall supports may be characterized by a storage modulus (60° C., 52 Hertz, 1% strain) of more than 4 MPa, in other embodiments more than 6 MPa, and in other embodiments more than 8 MPa. In these or other embodiments, the sidewall supports may be characterized by a storage modulus of less than 20 MPa, in other embodiments less than 18 MPa, and in other embodiments less than 16 MPa. In these or other embodiments, the sidewall supports may be characterized by a storage modulus (60° C., 52 Hertz, 1% strain) of from about 4 to about 20 MPa, in other embodiments from about 6 to about 19 MPa, and in other embodiments from about 7 to about 18 MPa. In one or more embodiments, the sidewall supports of this invention maintain at least 94%, in other embodiments at least 96%, and in other embodiments at least 98% of their storage modulus after one hour at 180° C. and 5% strain.

In one or more embodiments, the sidewall supports may be characterized by an elastic modulus of more than 5 $kg/cm^2$, in other embodiments more than 10 $kg/cm^2$, in other embodiments more than 20 $kg/cm^2$, in other embodiments more than 25 $kg/cm^2$. In these or other embodiments, the sidewall supports may be characterized by an elastic modulus of less than 70 $kg/cm^2$, in other embodiments less than 60 $kg/cm^2$, in other embodiments less than 45 $kg/cm^2$, in other embodiments less than 30 $kg/cm^2$.

In one or more embodiments, the sidewall supports may be characterized by the 100% tension modulus properties described in U.S. Publication No. 2010/0126648, incorporated herein by reference.

In one or more embodiments, the sidewall supports may have a maximum thickness of greater than 3 mm, in other embodiments greater than 6 mm, and in other embodiments greater than 9 mm. In these or other embodiments, the sidewall supports may have a maximum thickness of less than 18 mm, in other embodiments less than 15 mm, and in other embodiments less than 12 mm. In one or more embodiments, the sidewall supports may have a maximum thickness of from about 3 to about 18 mm, in other embodiments from about 6 to about 15 mm, and in other embodiments from about 9 to about 12 mm.

In one or more embodiments, the sidewall supports may be characterized by having a relatively high degree of cure, which can be quantified based upon extraction tests employing boiling cyclohexane as an extractant. In one or more embodiments, the sidewall supports include less than 10 wt %, in other embodiments less than 5 wt %, and in other embodiments less than 1.0 wt % extractable rubber.

In one or more embodiments, the sidewall supports may be characterized by a relatively high maximum torque (MH) when subjected to MDR analysis at 160° C. In one or more embodiments, the sidewall supports have an MH of greater than 35, in other embodiments greater than 40, in other embodiments greater than 45, and in other embodiments greater than 47 dNm.

Other Tire Components

The various tire components associated with the tires of the present invention may be prepared from conventional vulcanizable compositions of matter. Accordingly, practice of one or embodiments of the present invention does not alter conventional practice for preparing the various tire components. Generally speaking, these vulcanizable compositions may include an elastomer, a filler, and a curative, as well as other ingredients including, but not limited to, antidegradants, cure activators, cure accelerators, oils, resins, plasticizers, pigments, fatty acids, zinc oxide, and peptizing agents. Tire preparation is discussed in U.S. Pat. Nos. 5,866,171, 5,875,527, 5,931,211, and 5,971,046, which are incorporated herein by reference. Rubber compounding techniques and the additives employed therein are generally known as also disclosed in The Compounding and Vulcanization of Rubber, in Rubber Technology ($2^{nd}$ Ed. 1973), which is incorporated herein by reference.

Method of Applying Reinforcing Member

In one or more embodiments, the sidewall supports of this invention are applied (i.e. installed into a tire) after a cured tire is provided. In other words, the sidewall supports are applied to a tire that has undergone the vulcanization (i.e. curing) process associated with the manufacture of the tire. In one or more embodiments, applying the sidewall supports to a tire that has undergone the vulcanization process associated with the manufacture of the tire reduces the time required to fully cure the tire.

In one or more embodiments, once a cured tire has been provided, the sidewall supports are applied to the tire. The sidewall supports may be applied to the tire by positioning the reinforcing member within the tire at a desired location and then optionally applying an adhesive to the reinforcing member as well as to the other desired interior portions of the tire. In one or more embodiments, the reinforcing member is at least temporarily secured at a desired location using an adhesive. In other embodiments, the reinforcing member is at least temporarily secured into place by using mechanical means. In yet other embodiments, the reinforcing member is at least temporarily secured into a desired location by using an adhesive prior to curing; i.e. a green reinforcing member is applied to the interior of the tire prior to curing the tire, and upon the curing the tire, the entire composite is cured.

The sidewall supports may be provided within the interior of a tire using a variety of techniques. In one or more embodiments, the sidewall supports may be applied to the tire by the direct application of a solid composition that may be adhered directly to the innerliner layer of a cured tire. In other embodiments, where the cured tire is provided without a separate innerliner, the sidewall supports may be applied directly to the body ply or tire carcass.

As mentioned above, in one or more embodiments, an adhesive is employed to mate and/or bond the sidewall supports to the carcass or innerliner of the tire. As suggested above, the adhesive layer may derive from or include pressure sensitive adhesives, as well as the adhesive cements. These adhesives may include olefin-based adhesives, diene-based adhesives, acrylate-based pressure sensitive adhesives, polyurethanes, and epoxies. Specific examples of adhesives include synthetic-rubber-based adhesive including those dissolved by an organic solvent as well as water borne latexes, and acrylate or rubber-based pressure-sensitive adhesive tapes. The skilled person will be able to readily determine an appropriate method for applying the adhesive layer depending on the nature of the adhesive. For example, solvent-borne or liquid-based adhesives can be applied by spraying, brushing or other coating techniques. Hot-melt adhesives can also be applied by using extrusion techniques. And, tapes or other solid forms of pressure sensitive adhesives can applied by using conventional techniques.

In one or more embodiments, an intermediary layer is disposed below the sidewall supports (i.e. interior to the sidewall supports). For example, an intermediary layer may include a primer layer, a release agent layer, an adhesive, or a combination of two or more thereof.

In one or more embodiments, a primer layer may be present where there is a desire to improve the adhesion of the sidewall supports to the innerliner or carcass. An exemplary primer layer may include a composition including butyl rubber, such as those disclosed in U.S. Pat. No. 5,985,981, which is incorporated herein by reference.

As the skilled person will appreciate, release agents, such as silicone or silicone-based compositions, may be used during the tire manufacturing process. As a result, practice of the present invention may include applying the sidewall supports to a layer or film of release agent. In other embodiments, efforts may be made to remove or otherwise treat the release agents prior to application of the sidewall supports. As a result, practice of the present invention may include application of the sidewall supports to a residue of a release agent; for example, a residue resulting from the chemical treatment of a release agent layer or film.

INDUSTRIAL APPLICABILITY

In one or more embodiments, tires of the present invention, which may also be referred to as pneumatic tires, and which include the sidewall supports of this invention, may include passenger tires, truck/bus tires, off-road tires, agricultural tires and industrial tires. These tires and their common and distinct features are well known in the art. For example, agricultural and industrial tires include those described in, for example, U.S. Patent Publication No. 2005/0139302 A1, and U.S. Pat. Nos. 3,844,326, 4,202,391, 4,611,647, 4,791,971, 4,649,976, 5,046,541, 5,063,573, 5,188,683, 5,337,814, 5,337,816, 5,421,388, 5,464,050, 5,901,765, 6,179,027, 6,260,594, 6,263,933, 6,450,221, and 6,481,479, each of which is hereby incorporated by reference. All terrain or off-road tires include those described in, for example, U.S. Pat. Nos. 4,881,586, 5,259,429, 5,318, 086, 5,375,640, 6,293,323, 6,298,890, 6,401,774, 6,799,617, and 6,929,044, each of which is hereby incorporated by reference.

Various modifications and alterations that do not depart from the scope and spirit of this invention will become apparent to those skilled in the art. This invention is not to be duly limited to the illustrative embodiments set forth herein.

What is claimed is:

1. A method of preparing a sidewall support, the method comprising the steps of:
   (i) providing a vulcanizable composition including an elastomer, a filler, a curative, an antioxidant, and a eutectic composition, where the eutectic composition is defined by the formula $Cat^+X^-zY$, where $Cat^+$ is a cation, $X^-$ is a counter anion, and z refers to the number of Y molecules that interact with the counter anion, where the counter anion is a Lewis Base;
   (ii) fabricating the vulcanizable composition into a green sidewall support; and
   (iii) subjecting the green sidewall support to curing conditions.

2. The method of claim 1, where said vulcanizable composition includes greater than 1.5 pbw zinc oxide per 100 pbw rubber.

3. The method of claim 1, where the vulcanizable composition includes from about 0.005 to about 3 pbw of the eutectic composition per 100 pbw rubber.

4. A method of forming a pneumatic tire, the method including placing the sidewall support formed by the method of claim 1 into a green tire.

5. A method of forming a pneumatic tire, the method including placing the sidewall support formed by the method of claim 1 into a cured tire.

6. A method of preparing a sidewall support, the method comprising the steps of:
   (i) providing a vulcanizable composition including an elastomer, a filler, a curative, and a eutectic composition;
   (ii) fabricating the vulcanizable composition into a green sidewall support; and
   (iii) subjecting the green sidewall support to curing conditions;
   where the eutectic composition is formed by combining an ammonium compound with a metal halide, a metal halide hydrate, or a hydrogen bond donor.

7. The method of claim 6, where the ammonium compound is defined by the formula II:

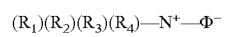

$$(R_1)(R_2)(R_3)(R_4)-N^+-\Phi^-$$

where each $R_1$, $R_2$, $R_3$, and $R_4$ is individually hydrogen or a monovalent organic group, or, in the alternative, two of $R_1$, $R_2$, $R_3$, and $R_4$ join to form a divalent organic group, and $\Phi^-$ is a counter anion.

8. The method of claim 6, where the ammonium compound is selected from the group consisting of N-ethyl-2-hydroxy-N,N-dimethylethanaminium chloride, 2-hydroxy-N,N,N-trimethylethanaminium chloride, and N-benzyl-2-hydroxy-N,N-dimethlethanaminium chloride.

9. The method of claim 6, where the ammonium compound is selected from the group consisting of 2-chloro-N,N,N-trimethylethanaminium and 2-(chlorocarbonyloxy)-N,N,N-trimethylethanaminium chloride.

10. The method of claim 6, where the hydrogen bond donor is selected from the group consisting of amines, amides, carboxylic acids, and alcohols.

11. The method of claim 6, where the hydrogen bond donor is selected from the group consisting of aliphatic amines, ethylenediamine, diethylenetriamine, aminoethylpiperazine, triethylenetetramine, tris(2-aminoethyl)amine, N,N'-bis-(2aminoethyle)piperazine, piperazinoethylethylenediamine, tetraethylenepentaamine, propylene amine, aniline, substituted aniline, and combinations thereof.

12. The method of claim 6, where the hydrogen bond donor is selected from the group consisting of urea, 1-methyl urea, 1,1-dimethyl urea, 1,3-dimethylurea, thiourea, urea, benzamide, acetamide, and combinations thereof.

13. The method of claim 6, where the hydrogen bond donor is selected from the group consisting of phenylpropionic acid, phenylacetic acid, benzoic acid, oxalic acid, malonic acid, adipic acid, succinic acid, citric acid, tricarballylic acid, and combinations thereof.

14. The method of claim 6, where the hydrogen bond donor is selected from the group consisting of aliphatic alcohols, phenol, substituted phenol, ethylene glycol, propylene glycol, resorcinol, substituted resorcinol, glycerol, benzene triol, and mixtures thereof.

15. The method of claim 6, where the metal halide is selected from the group consisting of aluminum chloride, aluminum bromide, aluminum iodide, zinc chloride, zinc bromide, zinc iodide, tin chloride, tin bromide, tin iodide, iron chloride, iron bromide, iron iodide, and combinations thereof.

16. A method of preparing a sidewall support, the method comprising the steps of:
   (i) providing a vulcanizable composition including an elastomer, a filler, a curative, an antioxidant, and a eutectic composition, where the vulcanizable composition includes a low molecular weight, high vinyl polydiene;
   (ii) fabricating the vulcanizable composition into a green sidewall support; and
   (iii) subjecting the green sidewall support to curing conditions.

17. A pneumatic tire comprising:
   (i) a tread;
   (ii) a carcass;
   (iii) an optional innerliner layer;
   (iv) a pair of sidewall supports disposed on the carcass or on the optional innerliner layer, if present, where said sidewall supports are prepared from a vulcanizable composition including an elastomer, a filler, a curative, an antioxidant, and a eutectic composition, where the eutectic composition is selected from the group consisting of a combination of a quaternary ammonium salt with a metal halide (Type I eutectic composition), a combination of a quaternary ammonium salt and a metal halide hydrate (Type II eutectic composition), a combination of a quaternary ammonium salt and a hydrogen bond donor (Type III eutectic composition), and a combination of a metal halide hydrate and a hydrogen bond donor (Type IV eutectic composition).

18. The pneumatic tire of claim 17, wherein the sidewall supports are substantially capable of supporting the tire in a run flat condition.

19. The pneumatic tire of claim 17, the tread having a first edge and a second edge, and the tire including a first bead and a second bead, where a first reinforcing member of the pair of sidewall supports extends generally from the first edge of the tread to the first bead, and where a second reinforcing member of the pair of sidewall supports extends generally from the second edge of the tread to the second bead.

20. The pneumatic tire of claim 17, wherein the sidewall supports are crescent shaped, or wherein the sidewall supports are elastomeric.

21. The pneumatic tire of claim 17, where the sidewall supports are characterized by a Shore A hardness at 100° C. of more than 60, a tan delta at 100° C. at 10 Hz of less than 0.20, a storage modulus at 10° C., 52 Hz, and 1% strain, of more than 6 MPa, an elastic modulus of more than 10 kg/cm$^2$, where the sidewall supports are characterized by a thickness of greater than 6 mm, and where the sidewall supports are characterized by a degree of cure where less than 5 wt % is extractable by boiling cyclohexane.

* * * * *